(12) United States Patent
Ishibashi et al.

(10) Patent No.: US 7,057,994 B2
(45) Date of Patent: Jun. 6, 2006

(54) APPARATUS AND METHOD FOR REPRODUCING INFORMATION FROM TWO TYPES OF OPTICAL DISKS HAVING DISCRIMINATION MARKS FORMED ALONG TRACKS THEREOF

(75) Inventors: Hiromichi Ishibashi, Osaka-fu (JP); Ken'ichi Kasazumi, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 55 days.

(21) Appl. No.: 10/814,192

(22) Filed: Apr. 1, 2004

(65) Prior Publication Data

US 2004/0184376 A1    Sep. 23, 2004

Related U.S. Application Data

(62) Division of application No. 09/610,364, filed on Jul. 5, 2000, now Pat. No. 6,738,326.

(30) Foreign Application Priority Data

Jul. 7, 1999 (JP) ................................. 11-192759
Aug. 20, 1999 (JP) ................................. 11-233816

(51) Int. Cl.
*G11B 7/09* (2006.01)

(52) U.S. Cl. ................ 369/53.23; 369/44.37; 369/47.17

(58) Field of Classification Search ............ None
See application file for complete search history.

(56) References Cited

U.S. PATENT DOCUMENTS

| | | | |
|---|---|---|---|
| 5,235,583 A | 8/1993 | Jongenelis et al. | |
| 5,410,531 A | 4/1995 | Tsujioka | |
| 5,544,141 A | 8/1996 | Kawasaki | |
| 5,708,636 A | 1/1998 | Takahashi et al. | |
| 5,729,514 A | 3/1998 | Horigome et al. | |
| 5,802,029 A | 9/1998 | Zucker | |
| 5,946,285 A | 8/1999 | Nakane et al. | |
| 6,052,344 A * | 4/2000 | Ueki | 369/44.27 |
| 6,055,076 A | 4/2000 | Takahashi et al. | |
| 6,614,720 B1 * | 9/2003 | Ogata et al. | 369/112.28 |

FOREIGN PATENT DOCUMENTS

| JP | 7-176052 | 7/1995 |
|---|---|---|
| JP | 8-102079 | 4/1996 |
| JP | 9-185833 | 7/1997 |

* cited by examiner

*Primary Examiner*—William Korzuch
*Assistant Examiner*—Michael V. Battaglia
(74) *Attorney, Agent, or Firm*—Wenderoth, Lind & Ponack, L.L.P.

(57) ABSTRACT

When information is reproduced in an optical disk of high recording density or of low recording density, a main beam and sub-beams are emitted onto adjacent tracks. The main beam has a shape longer in a direction perpendicular to the tracks. When the optical disk of high recording density is reproduced, cross talk components from adjacent tracks included in signals reproduced from reflection light of the main beam are canceled by using signals reproduced from reflection lights of the sub-beams. When the optical disk of low recording density is reproduced, information is reproduced with a beam. Thus, two types of optical disks can be reproduced with a simple structure in a compatible way. In the cross talk canceling, discrimination marks formed along the tracks at constant distances are reproduced, and a time difference between the main beam and the sub-beams is corrected precisely by using track jump and detection of discrimination marks.

1 Claim, 9 Drawing Sheets

Low density signal playback

Fig.4B

High density signal playback

APPARATUS AND METHOD FOR REPRODUCING INFORMATION FROM TWO TYPES OF OPTICAL DISKS HAVING DISCRIMINATION MARKS FORMED ALONG TRACKS THEREOF

This application is a divisional application of Ser. No. 09/610,364, filed Jul. 5, 2000 now U.S. Pat. No. 6,738,326.

BACKGROUND OF THE INVENTION

1. Field of the Invention

The present invention relates to reproduction of optical information recorded in optical recording media of high and low recording densities with an apparatus in a compatible way.

2. Description of Prior Art

Recently, DVDs (digital video disks) for providing high quality digital pictures and audio sound and optical disk drives or players for reproducing DVDs become very popular. The popularity of DVD players is ascribed to the high quality of DVDs, but it is also ascribed largely to the compatibility with previous media, that is, assurance to reproduce compact disks.

It seems easy at first to reproduce an optical disk of low recording density (for example, compact disk (CD)) in an optical disk drive for an optical disk of high recording density (for example, DVD). However, pit marks formed on an optical disk are designed to be optimum for a shape of a laser beam spot which illuminates the pit marks. Therefore, various problems have to be solved even for reproducing an optical disk of low recording density which deviates from the optimum conditions.

As a most typical example, so-called mirror phenomenon occurs when recording pits of low density are reproduced with a very small laser beam spot emitted from a pickup for high resolution. Digital visual and audio information is formed on an optical disk (for example, compact disk) as pits formed unevenly, while a film (for example, made of aluminum or gold) of the same reflectance is deposited on all of the plane thereof, irrespectively of the pits. Even if the reflectance is the same, information can be obtained by using diffraction at pit edges. Because a pit is formed to have width of about a half of a size of the laser beam spot, a part of the laser beam is diffracted at an edge of the pit so as not to enter a photodetector. However, when the pit is reproduced with a pickup of high resolution in correspondence to another optical disk (for example, DVD) of high density, because the laser beam spot is very small, almost all of the laser beam spot illuminates the inside of the pit. Thus, sufficient diffraction at the edge does not occur, and the reflected light increases. This is the so-called mirror phenomenon. It is assumed here that spherical aberration due to difference of the thickness of the substrates of two disks (for example, CD and DVD) is solved by an appropriate means.

For compatible reproduction of two types of optical disks, it is proposed in Japanese Patent laid open Publication 8-102079/1996 to enlarge the laser beam spot when information of low density is reproduced with a diaphragm. However, this needs an expensive optical component such as a nonlinear optical filter. It is also proposed in Japanese Patent laid open Publications 9-185833/1997 and 10-208276/1998 to change lenses of different numerical apertures. However, in order to change the lenses, a structure of pickup becomes complicated. It is further proposed to enlarge the laser beam spot size by limiting the aperture with a hologram or the like. However, this worsens efficiency of the laser beam due to diffraction loss at the hologram.

SUMMARY OF THE INVENTION

An object of the present invention is to provide an apparatus and method for reproducing two types of optical disks in a compatible way in a simple structure.

In an aspect of the invention on an apparatus for reproducing information in an optical disk of a first recording density and in another optical disk of a second recording density lower than the first one, a light source emits a main beam and sub-beams onto adjacent tracks formed in an optical disk, and a photodetector detects reflection lights of the main beam and the sub-beams from the optical disk, and a reproduction device reproduces information in the optical disk based on signals received from the photodetector. The main beam emitted by the light source has a size in correspondence to resolution of the optical disk of the first recording density in a direction tangent to the tracks and has a shape longer in a direction perpendicular to the tracks. In the reproduction device, a canceler cancels cross talk components from adjacent tracks included in signals reproduced from reflection light of the main beam by using signals reproduced from reflection lights of the sub-beams.

In a second aspect of the invention, in three-beams canceling for an optical disK, discrimination marks are formed at predetermined constant distances, the reproduction device discriminates a first discrimination mark in a track with a first beam of the main and sub-beams and a second discrimination mark in the track with a second beam of the main and sub-beams after the second beam jumps to the track. Then, a time difference when the first and second discrimination marks are discriminated is determined. Cross talk between tracks is canceled in the reproduction signals according to the determined time difference and a predetermined time difference in correspondence to the constant distance of the discrimination marks.

An advantage of the present invention is that compatibility of an optical disk apparatus for optical disks of different recording density can be ensured in a simple structure.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
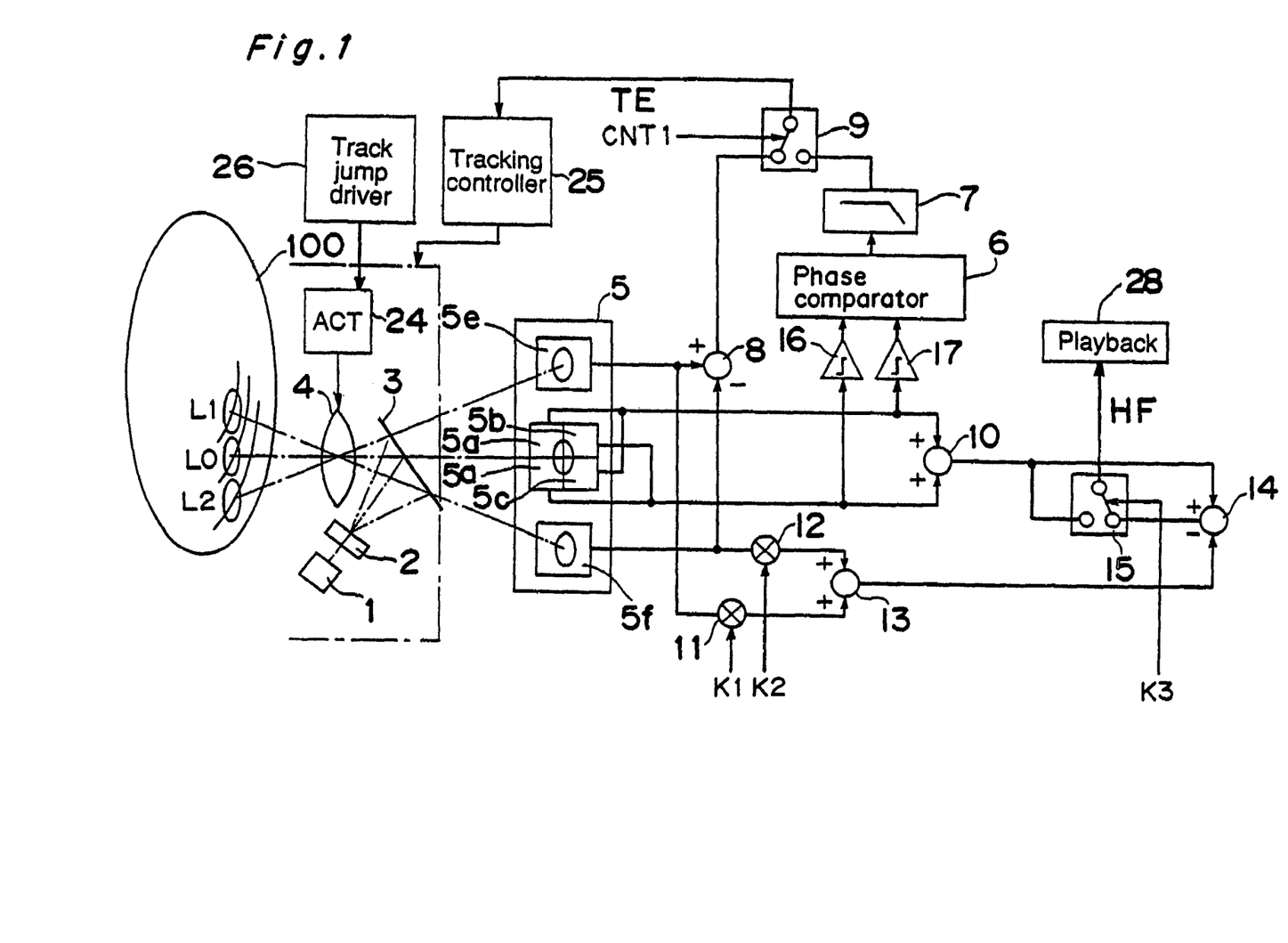
FIG. 1 is a block diagram of an optical disk apparatus according to a first embodiment of the invention.

Referring now to the drawings, wherein like reference characters designate like or corresponding parts throughout the several views, FIG. 1 shows an optical disk apparatus according to a first embodiment of the invention. The optical disk apparatus reproduces information from two types of optical disks of high density and low density (for example, DVD and compact disk). An optical disk 100 is rotated by a spindle motor (not shown). An optical head is composed of a laser light source 1, a grating 2, a half mirror 3, an object lens 4, a photodetector 5 and an actuator 24, and the optical head is driven by a tracking controller 25 over the optical disk 100. A laser beam emitted by the laser light source 1 is divided into three by the grating 2, and the three beams enter via the half mirror 3 to the object lens 4 to form three beam spots L0 (main spot) and L1 and L2 (sub-spots) on the optical disk 100. After these beams are reflected by the optical disk 100, they propagate again through the object lens 4 and the half mirror 3 onto the photodetector 5. The main spot L0 is divided into four by photo-elements 5a, 5b, 5c and 5d in the photodetector 5 to be outputted as electrical signals. The output electrical signals are synthesized by an adder 10 and sent via a switch 15 as reproduction signal HF to a playback section 28 which reproduces the information.

A characteristic of the apparatus is that the beam spots illuminating the optical disk 100 are substantially elliptic longer in a direction perpendicular to tracks formed in the optical disk. The size of the beam spots in a direction of tangent lines of the tracks is determined in correspondence to the resolution of the optical disk of high recording density.

Figure 2A:
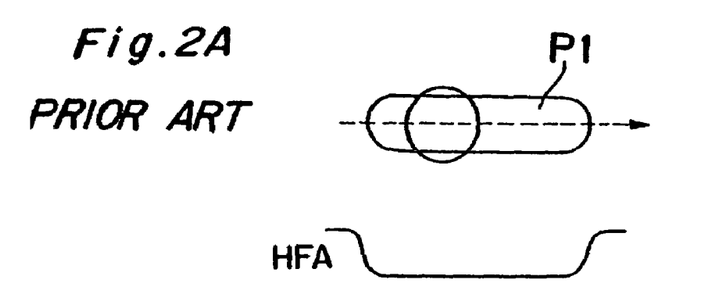
FIGS. 2A, 2B and 2C are diagrams for explaining the operation of beam spots of circular and elliptical shapes.
Figure 2B:
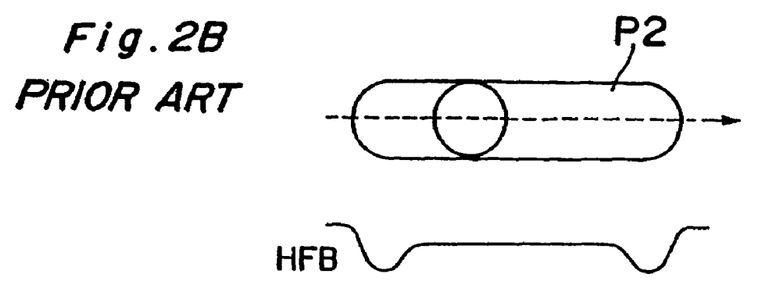
Figure 2C:
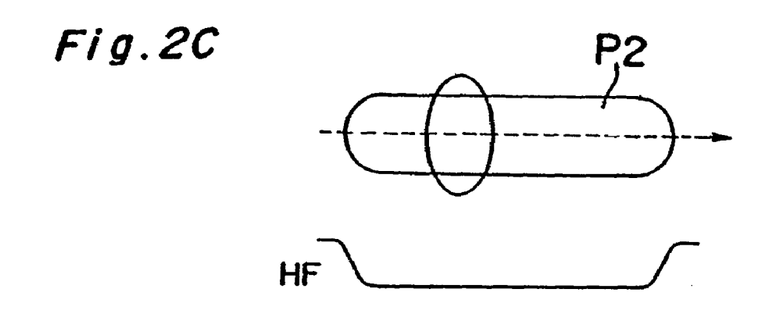

It is explained below with reference FIGS. 2A to 2C why the beams have the above-mentioned shapes. As shown in FIG. 2A, previously, the beam spot illuminating the optical disk is generally circular. An arrow means a scan direction of the beam spot. Two sides of the beam are diffracted at edges of a pit P1, so that a part of the reflected light does not enter the photodetector 5. Then, reproduction signal HFA as shown in FIG. 2A is obtained. However, when the beam is used to reproduce a pit mark P2 recorded at a lower density, as shown in FIG. 2B, the beam spot illuminates the inside of the pit mark P2. Then, the advantage of diffraction is not obtained sufficiently, and the so-called mirror phenomenon occurs in reproduction signal HFB. On the contrary, according to this embodiment, as shown in FIG. 2C, the shape of the beam spot is elliptical or longer in a direction perpendicular to the tracks. Then, the beam is diffracted sufficiently at edges of the pit P2 for lower density, so that the mirror phenomenon is improved on the reproduction signal HF.

Figure 3:
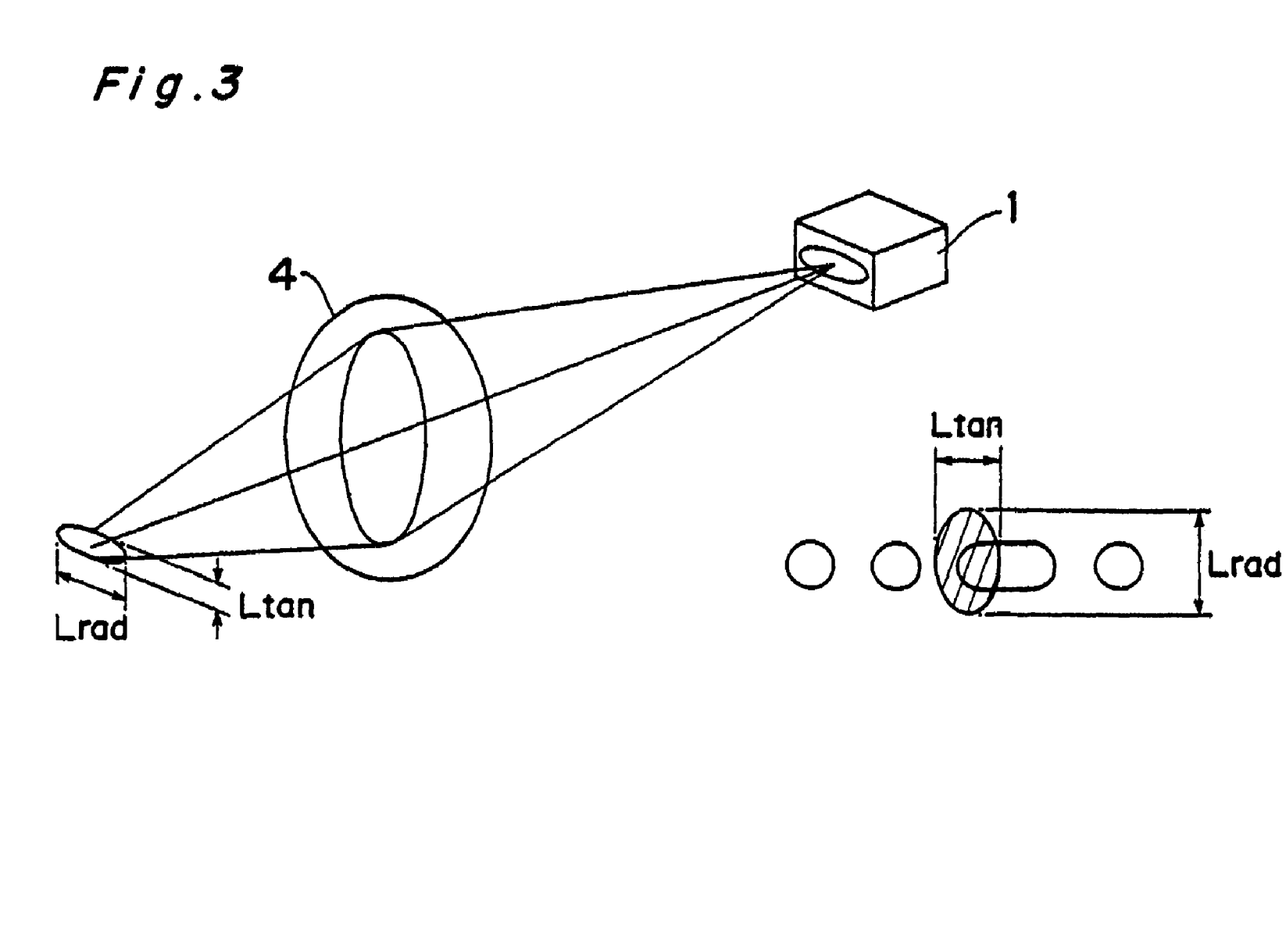
FIG. 3 is a diagram of laser beam emitted by a laser diode.

The laser beam having an elliptical shape is generated, for example, by using following means. As shown in FIG. 3, the light source 1 has a laser diode, and an as-emitted beam of the laser diode is elliptical. Then the as-emitted beam is used as the light beam of elliptical shape. Alternatively, an optical system (not shown) is used for ellipse correction of weak angular magnifying power to weaken the ellipticity somewhat. When it is assumed that a ratio of width of a pit P1 in a high density optical disk to that of a pit P2 in a low density optical disk is 1.5 to 2.0, it is desirable that a ratio of the length (Lrad) of the beam spot in a direction perpendicular to the tracks in a recording plane in the optical disk 100 to the length (Ltan) thereof in a direction tangential to the tracks is as follows:

$$1.2 \leq L\text{rad}/L\text{tan} \leq 1.5 \qquad (1)$$

The lower limit 1.2 in Eq. (1) corresponds to a beam width which can generate diffracted light in the lowest degree so as not to cause remarkable mirror phenomenon. The upper limit 1.5 is based on the largest beam width which can permit influence of cross talk from adjacent tracks.

The beam has the elliptical shape longer only in a direction perpendicular to the tracks, so as not to decrease resolution in a direction tangential to the tracks. Therefore, when the information recorded at high density is reproduced, deterioration of the reproduced signals due to code interference from adjacent pit marks is of about the same order as the prior art. However, even if the elliptical shape satisfies the relationship of Eq. (1), deterioration of the reproduced signals may happen somewhat due to cross talk from adjacent tracks. Then, in this embodiment, in order to delete the influence of cross talk, the cross talk is canceled by using the sub-beams L1 and L2. The sub-beams L1 and L2 are located above the two adjacent tracks, and reflection lights thereof are incident on photo-elements 5e and 5f in the photodetector 5. Output signals thereof are multiplied with appropriate constants K1 and K2 by amplifiers 11 and 12 of variable gain. Then the signals are added by an adder 13, and the sum is subtracted further by a subtractor 14 from a signal due to the main beam. The result is sent via the switch 15 to the playback section 28 as the reproduction signal HF. By selecting the constants appropriately, cross talk components due to the two adjacent tracks can be deleted completely in the reproduction signal HF.

The switch 15 selects according to signal K3 whether the signal subjected to the cross talk canceling is outputted or not. When information in a recording medium of low density is reproduced, the signal received from the adder 10 is outputted without further processing. The type of optical disk 100 is discriminated by a discriminator (not shown), and the discriminated result is sent as signal K3 to the switch 15.

In the above-mentioned cross talk canceling by using the sub-beams L1, L2, the output signals of the photo-elements 5e and 5f are subjected to the multiplication, addition and subtraction. However, there are cases where the main beam L0 and the sub-beams L1, L2 have to illuminate tracks separately from each other in a direction tangential to the tracks. In such cases, the positions of the beams are not aligned in a direction perpendicular to the tracks, and delay adjustment (time difference correction) is necessary, before the above-mentioned addition and subtraction, in order to correct delay times between the beams. This will be explained later in a third embodiment of the invention.

Next, tracking error detection is explained. When information recorded at high density is reproduced, phase a difference detection technique appropriate for a medium of high density is used. That is, the reflection light of the main beam is divided by the four photo-elements 5a, 5b, 5c and 5d to be outputted as electrical signals. The output signals of diagonal pairs of the elements (the photo-elements 5a and 5c, and those 5b and. 5d) are binarized by comparators 16 and 17, and a phase comparator 6 detects the phase difference between them. The phase difference is smoothed by a low pass filter 7, and it is sent as tracking error signal TE via a switch 9 to the tracking controller 25. The tracking controller 25 moves the optical head in the radial direction and controls the tracking of the beams according to the tracking error signal TE. Further, a track jump driver 26 controls the actuator 24 for track jump of the beams.

Figure 4A:
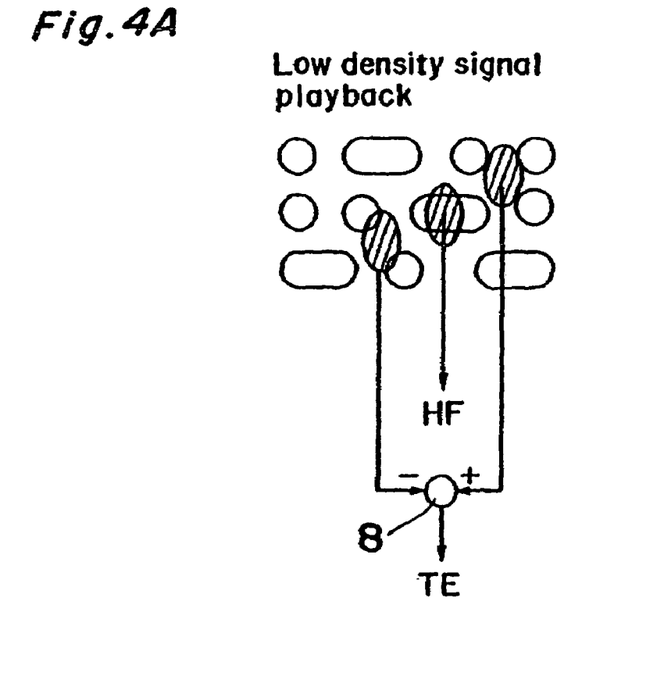
FIGS. 4A and 4B are diagrams for explaining three-beams tracking.
Figure 4B:
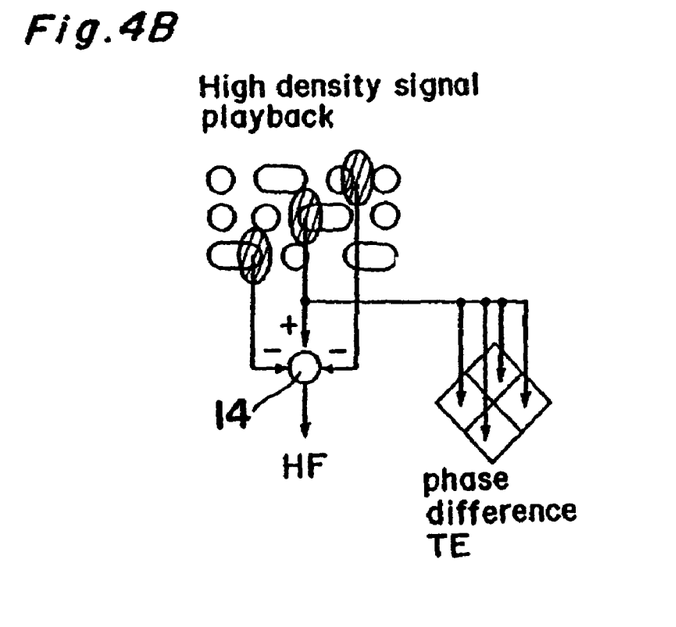

The phase difference detection technique may also be used for reproducing information recorded at low density. However, when the track pitch is wider than the elliptical beam, there are cases where noises are superposed on the phase difference tracking error signal because there is an area between adjacent tracks where no signals are recorded. The comparators 16, 17 are operated with signals of noise levels in the no-signal area, so that the phase difference between the noise pulses is outputted as a false tracking error signal. In this embodiment, when signals of high density are reproduced, the sub-beams L1, L2 are used for cross talk canceling, while they are also used as sub-beams for so-called three-beams tracking error signal detection (FIGS. A and B). That is, the output signals of the photo-elements 5e and 5f are processed by the subtractor 8 to output a difference signal as three-beams tracking error signal. The switch 9 selects one of the phase difference tracking error signal and the three-beams tracking error signal.

The intensity of the sub-beams is about ten percent of that of the main beam because a signal-to-noise ratio sufficient to remove weak cross talk due to adjacent tracks can be kept. That is, when the beam of the laser light source 1 is divided by the grating 2 into sub-beams, the loss in light intensity is about 20%, and it is smaller than the counterpart (40–50%) when a hologram is used. Further, because the as-emitted elliptical laser beam transmitted through the object lens 4, as shown in FIG. 3, decrease due to the aperture of the object lens is small, and the propagation efficiency from the light source 1 to the optical disk 100 is improved.

As mentioned above, three non-circular beams illuminate three adjacent tracks, and the cross talk canceling is performed appropriately. Then, compatibility for optical disks of different recording densities can be ensured.

Figure 5:
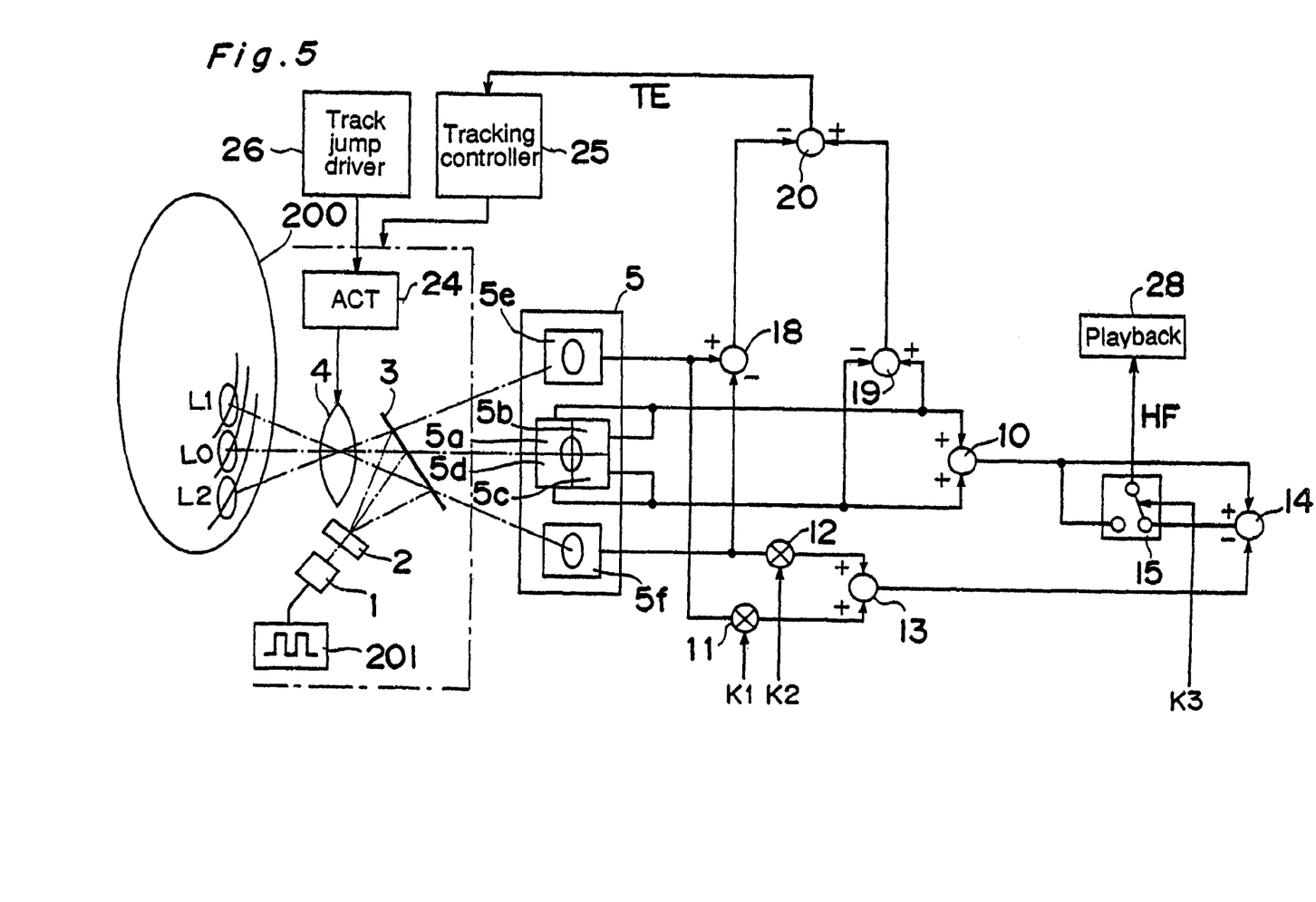
FIG. 5 is a block diagram of an optical disk apparatus according to a second embodiment of the invention.

Next, an optical disk apparatus according to a second embodiment of the invention is explained with reference to FIG. 5. The light source 1, the grating 2, the half mirror 3, the photodetector 5, the variable-gain amplifiers 11, 12, the adders 10, 13, the subtractor 14 and the switch 15 have like functions as the counterparts shown in FIG. 1.

A characteristic of the apparatus is that it can record information to an optical disk 200 with a laser pulse emitted by the light source 1 and modulated by a modulator 201. Another characteristic is that push-pull tracking error signal is used. A subtractor 19 generates so-called push-pull tracking error signal PTE from a difference of the outputs of the photo-elements 5a, 5b and that of the photo-elements 5c, 5d. Further, a subtractor 18 generates a difference signal from output signals of the photo-elements 5e and 5f for the sub-beams. Then, a subtractor 20 is used to correct the push-pull tracking error signal PTE.

Figure 6:
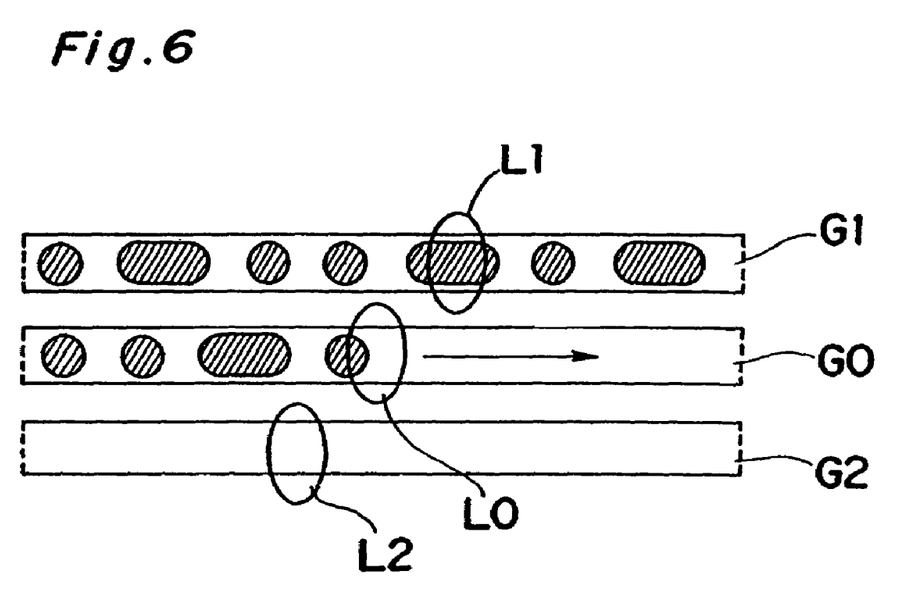
FIG. 6 is a diagram for explaining tracking error correction.

The optical disk 200 has grooves formed preliminarily as shown in FIG. 6, and information can be recorded with the laser beam while tracking a groove. In this case, the tracking error signal is detected with so-called push-pull technique wherein difference in light intensity is detected of the light diffracted at an edge in the tangential direction of the track of the groove.

However, in the push-pull technique, it is liable to have an offset due to an imbalance of light intensity, and it is a problem that information is not recorded at the center of the track when an off-track situation happens. For example, as shown in FIG. 6, in an optical disk wherein information has been recorded in an adjacent groove G1 and has not yet been recorded in another adjacent groove G2 and information is recorded with main beam L0 in a groove G0, imbalance of intensity of reflection light occurs due to cross talk from the two adjacent grooves. That is, the light reflected from groove G1 is darker, so that the tracking position is shifted from the track center towards the groove G2. Then, information is recorded in a position deviated eventually from the track center.

Then, in this embodiment, the imbalance of light intensity is corrected by using the sub-beams illuminating the grooves G1 and G2. The reflection light obtained by the sub-beam L1 scanning the groove G1 wherein information has been recorded is weaker than that obtained by the sub-beam L2 which scans the groove G2 wherein information is not recorded, so that imbalance occurs in the output of the subtractor 18. Then the subtractor 20 is used to delete the imbalanced quantity from the push-pull tracking error signal PTE. Thus, the cross talk offset due to adjacent tracks in the push-pull tracking error signal obtained by the main beam is corrected by using the reflection lights of the sub-beams illuminating the adjacent tracks. Therefore, the cross talk can be cancelled regardless of recording in adjacent tracks, and the tracking error signal can be detected without offset.

Next, an optical disk apparatus according to a third embodiment of the invention is explained for correcting time delays between the beams. When the above-mentioned three-beams cross talk canceling using the sub-beams L1, L2 is used practically, a following problem exists. If the main beam L1 and the sub-beams L1, L2 are arranged in a line perpendicular to the tracks, the apparatus shown in FIG. 1 can be used with no problems. However, when the main beam L1 and the sub-beams L1, L2 are arranged in a line perpendicular to the tracks, the distances between the beams are generally the track pitch, so that it is difficult to separate them from each other by the photodetector. Then, the sub-beams are arranged in a line crossing the tracks obliquely, while being separated sufficiently from each other in the tangential direction of the tracks. In this case, reproduction signals due to the beams have time differences in correspondence to the distances in the tangential direction.

This problem of the three-beams cross talk canceling has already been noted, and solutions therefor have been proposed. For example, in Japanese Patent laid open Publication 7-176052/1995, a variable delay means is provided in a reproduction system of each beam. Cross talk correlation is calculated between the reproduction signals, and delay quantities are determined so as to maximize the correlation. However, because sufficient detection sensitivity cannot be obtained, it is difficult to detect and correct the time difference precisely. Further, in Japanese Patent laid open Publication 5-115106/1993, discrimination marks are formed beforehand in tracks so as to align in a direction perpendicular to the tracks. Then, correction delay quantities are determined according to timings where the beams scan the discrimination marks in the tracks. However, this method is restricted by a format of optical disk.

This embodiment solves the above problem of time difference correction in a different way. Time differences between the beams are detected and corrected precisely for an optical disk having general formats such as compact disk and DVD.

Figure 7:
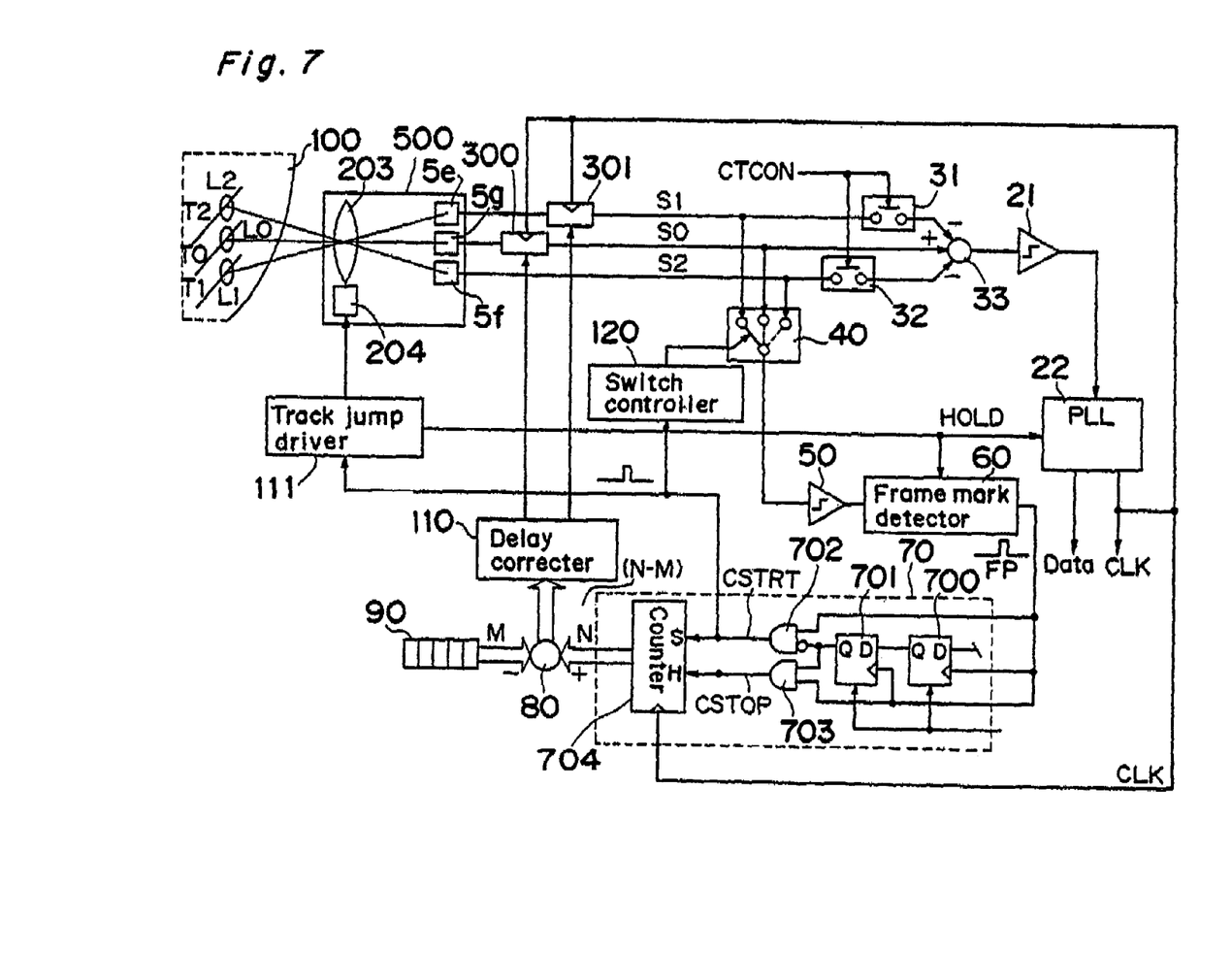
FIG. 7 is a block diagram of an optical disk apparatus according to a third embodiment of the invention.

FIG. 7 shows an optical disk apparatus according to the third embodiment of the invention. Three beams, main beam L0 and sub-beams L1, L2, illuminate tracks T0, T1,T2 formed in an optical disk 100, and reflection lights thereof are received by photo-elements 5g, 5e and 5f in the photodetector 500 to be converted to electrical signals. The detection signals obtained by the photo-elements 5g, 5e with the main beam and the sub-beam are subjected appropriately to time correction by delay elements 300 and 301. Then, the detection signals obtained by the three beams are subjected to cross talk calculation by a calculator 33 for addition and subtraction (in correspondence to the adder 13 and the subtractor 14) to delete cross talk components due to the adjacent tracks. If the time differences are not corrected perfectly by the delay elements 300 and 201, the cross talk components are not deleted completely. Further, if the time error is large, components due to adjacent tracks are added on, and the signal-to-noise ratio of reproduction signals becomes even worse.

In this embodiment, the time difference correction is performed by using frame marks formed beforehand with equal distances between them along tracks in an optical disk. A frame is a unit of recorded information in an optical disk, and a frame mark is formed at the top of a frame in a way so as to be discriminated easily from other marks on information. For example, a frame mark is formed for each 1,456 bits in a DVD, and it has a length of 14T (where T denotes channel bit length) in contrast to 3T to 11T of the other information. Therefore, if the frame mark can be detected, time errors of the beams can be detected and corrected according to the difference of the timings at which frame marks are detected. However, though the frame marks are formed at equal bit distances, they are not necessarily aligned in a direction perpendicular to the tracks. In order to align the frame marks in a direction perpendicular to the tracks, the same number of information pits per one circle of track have to be formed for every track (so-called constant angular velocity recording). However, for a DVD or CD, information is recorded with constant line velocity recording. Thus, the bit number in one track is different according to the position in the radial direction.

Figure 8:
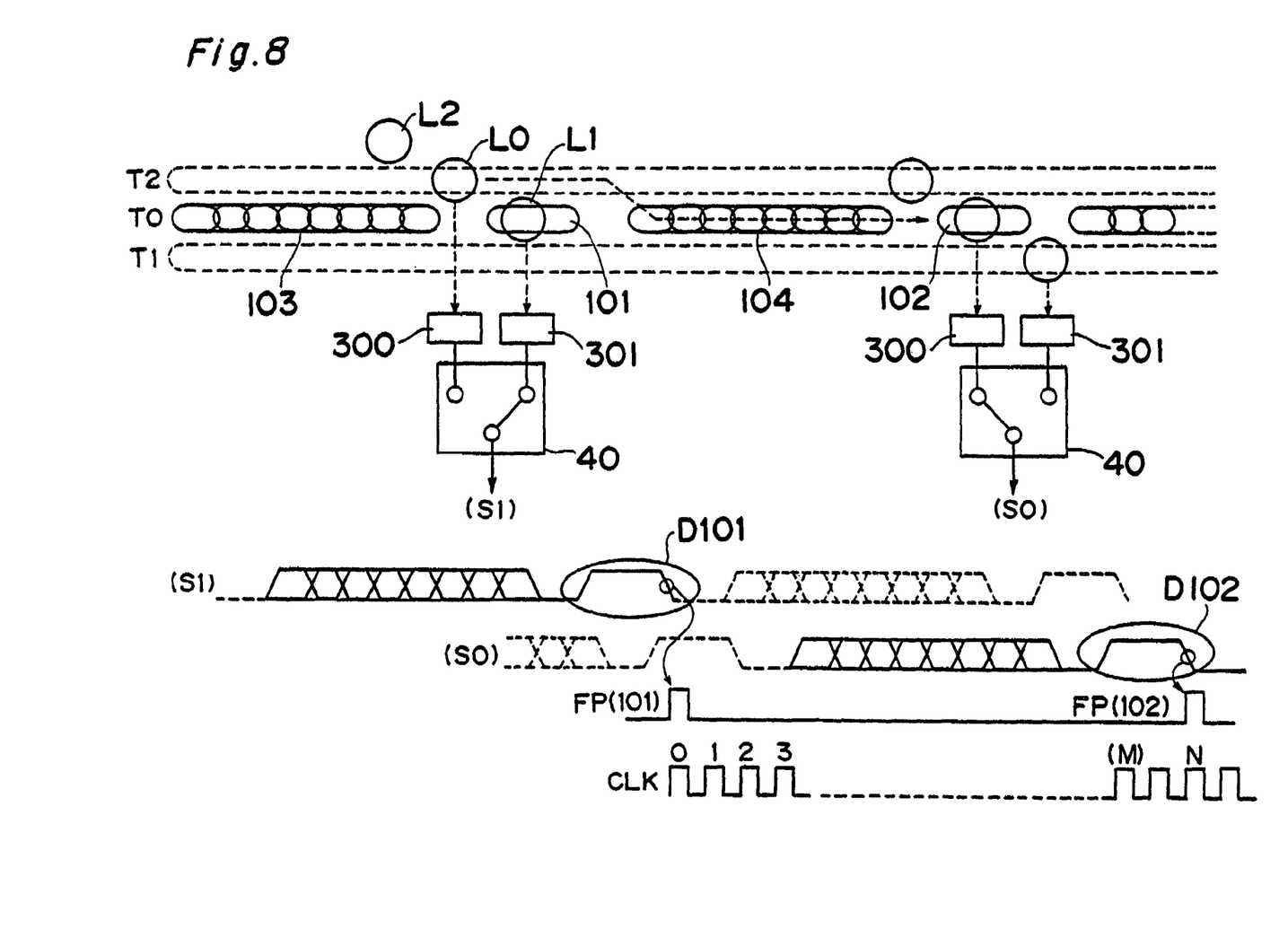
FIG. 8 is a timing chart for explaining time difference correction.

The time correction by using frame marks is explained further with reference to FIGS. 7 and 8. In a situation shown in FIG. 8, the main beam L0 is tracking a track T2, while the sub-beam L1 scans a track T0. Along the track T0, an information mark group 103, a frame mark 101, an information mark group 104 and a frame mark 102 are formed. For example, in a DVD, the information mark groups 103, 104 are composed of random data of mark lengths of 3T to 11T. On the other hand, the frame marks 101, 102 include a mark of length of 14T not included in the information mark groups. In FIG. 7, a signal selector 40 selects reproduction signal S0, S1, S2 from the photodetectors in correspondence to the beams to be supplied via a binarizer circuit 50 to a frame mark detector 60. The frame mark detector 60 detects a frame mark. For example, it counts the mark length of every signal sequence in the input signals and outputs a pulse signal when a mark length of 14T is detected. When the main beam L0 tracks the track T2, or when the sub-beam L1 tracks the track T0, as shown in FIG. 8, the signal selector 40 selects the reproduction signal due to the sub-beam L1. Therefore, when the sub-beam L1 scans the frame mark 101, the frame mark detector 60 detects it and outputs a detection pulse FP. For brevity of explanation, selection of reproduction signal S2 by the sub-beam L2 is omitted in FIG. 8.

Once reproduction signal D101 due to a frame mark 101 is detected, a mark distance measuring device 70 is activated to count a time until another reproduction signal D102 due to a next frame mark 102 is detected. As shown in FIG. 7, the mark distance measuring device 70 is composed of flip flops 700, 701, gates 702, 703 and a counter 704. When the first frame mark detection pulse FP (D101) is detected, the outputs of the flip flops 700 and 701 become H level and L level, so that the frame mark detection pulse passes the gate 702 to supply a start pulse CSTRT which starts the counter 704. The start pulse CSTRT is also sent to a track jump driver 111 which makes a tracking actuator 204 perform track jump by moving an object lens 203. Then, as shown in FIG. 8, the main beam L0 is jumped from track T2 to track T0. Further, start pulse CSTRT is also sent to a switch controller 120, which controls the signal selector 40 to change the reproduction signal S1 due to the sub-beam L1 to the reproduction signal S0 due to the main beam L0.

Next, when the frame mark FP (102) is detected with the main beam L0, the outputs of the flip flops 700 and 701 become H level and H level, so that the frame mark detection pulse passes the gate 703 to supply a stop pulse CSTOP which stops the counter 701. The count value of the counter 701 is represented as N.

On the other hand, because the frame marks 101 and 102 are provided at the predetermined constant distance, if they are reproduced continuously with the same beam without track jump, a count of predetermined value of M will be obtained surely. For example, for a DVD, M=1456 surely when the distance is measured with the channel clock.

By comparing the count N obtained by the mark distance measuring device 70 with the count M, a subtractor 80 determines the time difference between the reproduction signals of the two beams. Time delays are given by the delay means 300 and 301 to the reproduction signals S0 and S1. If the time delays are appropriate or if the time difference in correspondence to the distance in tangential direction for the main beam S0 and the sub-beam S1 is corrected perfectly, the count N is surely equal to the value M. In other words, the error (N–M) between the count N and the value M represents correction error on time correction between the beams. The value M is stored in a register 90.

Figure 9:
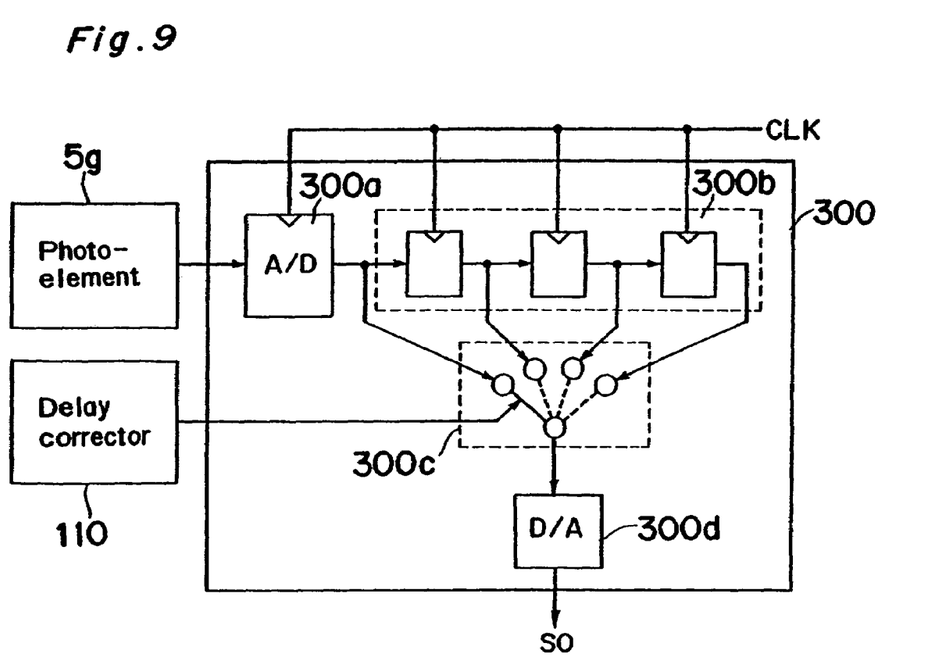
FIG. 9 is a block diagram of an example of delay means.

A delay corrector 110 sets delay quantities to the delay means 300, 301 so that the error (N–M) obtained by the subtractor 80 becomes zero. FIG. 9 shows an example of the delay corrector 110. An output signal of the photo-element 5g in the photodetector 200 is converted to a digital signal by an analog-to-digital converter 300a. Then, it is converted by a shift register 300b to give a delay for each clock period successively at the rising edge of clock signal CLK. A selector 300c selects one of the output of registers in the shift register 300b, and a digital-to-analog converter 300d converts it again to an analog signal as reproduction signal S0. Thus, the delay quantity is changed in the unit of one clock period in the delay means 300. The other delay means 301 is constructed similarly.

The time correction between the main beam L0 and the sub-beam L1 is explained above. Further, time correction between the main beam L0 and the sub-beam L2 may be performed similarly. For example, after the above-mentioned processing is completed, the flip flops 700, 701 and the counter 704 in the mark distance measuring device 70 are reset. Then, after the frame mark 101 is reproduced with the sub-beam L2, track jump is performed, and the frame mark 102 is reproduced with the main beam L0. Then, the delay quantities are set to the delay means 300, 301 so that the difference between the count M and the value N becomes zero. The delay quantity is set again to the delay element 301 because the relative delay quantity for the delay means 300, 301 determined above have to be kept.

When the delay quantities to the delay means 300 and 301 are set appropriately for the main beam L0 and the sub-beams L1, L2, cross talk is deleted appropriately by the calculator 33 for addition and subtraction. The signal after cross talk canceling is supplied via a binarizer circuit 21 to a phase lock loop (PLL) circuit 22. Then, data component DATA and clock signals CLK are separated, and the data are supplied to a circuit at a later stage, such as a digital video decoder.

The PLL clock signal is supplied not only to the circuits at later stages, but also to the counter 704. It is stated above the M=1456 for a DVD. The value M is a count between two frame marks measured with channel clock signals on which reproduction signals are derived. When the PLL circuit is activated, the clock signals CLK generated therein correspond to the channel clock signals.

The PLL clock signals are also supplied to the delay means 300 and 301 according to following reasons. The optical disk apparatus corrects position errors of the main beam L0 and the sub-beams L1, L2 in the tangential direction of the tracks. Even if optimum delay quantities for the delay means 300 and 301 are determined, a condition has to be satisfied that the reproduction speed of signals is constant. When the speed of reproduction signal is changed for example due to a change in revolution of optical disk 100, the optimum delay quantities have to be set again according to the change. The above-mentioned time difference correction may be performed at that time, but while time difference correction is performed, information cannot be reproduced and this is a loss time which worsens the performance of the entire system. Then, in the apparatus, the time difference is measured in the unit of the clock period, and the delay quantities for the delay means 300 and 301 are changed in proportion to the speed of reproduction signals. The PLL circuit 22 generates clock signals in synchronization on frequency with the reproduction signals inherently. Further, as mentioned above, the delay means 300, 301 are constructed as shown in FIG. 9 to give delay in the unit of the clock period. Then as far as the PLL circuit 22 is operated, the delay quantity is changed according to the speed of the reproduction signal. In other words, once the time difference correction is performed at a reproduction speed while the PLL circuit 22 is operated, cross talk canceling can be performed always at the optimum state even if the reproduction speed is changed.

However, there is a following problem. When the time difference is corrected while the PLL circuit 22 is operated, there may occur a time difference between the reproduction signals of the main and sub-beams in a transition time until time correction is completed. When the cross talk canceling is performed in this situation, the reproduction signals are deteriorated reversely, and the locking of the PLL circuit 22 is liable to be unlocked. Then, in this apparatus, switches 31 and 32 are inserted in paths for the reproduction signals. S1 and S2 due to the sub-beams so as to prevent cross talk canceling. The operation sequence of the switches 31 and 32 are not shown, but control signal CTCON may be supplied to open the switches when the time difference correction is started, and to close them when the correction is completed.

Further, when a beam passes across an area between tracks without recorded information during a track jump, disturbances in the PLL circuit 22 due to noises are liable to occur. Further, noises similar to a frame mark may appear. Therefore, it is favorable in a track jump period to generate a hold pulse (HOLD) by the track jump driver 111 to stop the PLL circuit 22 and the frame mark detector 60 temporarily.

As explained above, the time difference between the beams can be corrected precisely by detecting frame marks formed at the same distance along the same track. That is, by reproducing the frame marks by the two beams while repeating track jump, the delay quantity is corrected according to a measured distance between the frame marks and the frame mark distance determined in the format of the optical disk. Because the time difference between the beams is precise, the cross talk canceling can always be performed optimally.

Further, by using the shift register 300b synchronized with the PLL clock signals for the delay means, even when the reproduction speed is changed, the time difference can be given always with the optimum correction quantity. Therefore, cross talk canceling can be realized stably and at high precision.

Though tracking is always performed with the main beam L0 in this embodiment, but it may be performed with the sub-beam L1, L2. For example, the tracking is performed on a beam reproducing the track T0 among the main and sub-beams. This is favorable when the sub-beam is not above the adjacent track (for example when it is near the main beam somewhat).

The counter 703 is operated with the PLL clock signals in the apparatus. However, the clock signals for the counter are not necessarily synchronous with the reproduction signals as far as the frame mark distance is represented uniquely. For example, before starting the time difference correction, the frame mark distance is measured with the same beam on the same track, and the measured value is stored as the value M in the register 90.

An example of the delay means 300 is shown in FIG. 8. However, if the calculator 33 and the PLL circuit 22 are digital circuits, it is not necessary to perform the digital-to-analog conversion again after the analog-to-digital conversion.

In this apparatus, after the frame mark 101 is detected with the sub-beam L1, track jump is performed, and the frame mark 102 is detected with the main beam L0. However, the processing may be started from the main beam L0 within the spirit of the time difference correction in this embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for reproducing information in an optical disk of a first recording density and in another optical disk of a second recording density lower than the first recording density, said apparatus comprising:
   - an optical head having a light source operable to emit a main beam and sub-beams onto adjacent tracks formed in an optical disk, the main beam having a same spot size for the optical disk of the first recording density and the optical disk of the second recording density;
   - a photodetector operable to detect reflection lights of the main beam and the sub-beams emitted by said light source from the optical disk;
   - a reproduction device operable to reproduce information in the optical disk based on signals received from said photodetector; and
   - a tracking controller operable to control tracking of said optical head having said light source based on output signals of said photodetector,
   - wherein said light source emits the main beam to have a size in correspondence to a resolution of the optical disk of the first recording density in a direction tangent to the tracks and a shape longer in a direction perpendicular to the tracks,
   - wherein said reproduction device has a first canceler operable to cancel cross talk components from adjacent tracks included in signals reproduced from reflection light of the main beam by using signals reproduced from reflection light of the sub-beams, and wherein said tracking controller comprises a tracking error signal generator operable to generate a tracking error signal based on a phase difference between signals of the reflection light of the main beam divided into a plurality of portions detected by said photode tector when information in the optical disk of the first recording density is reproduced, and operable to generate the tracking error signal based on signals of the reflection light of the sub-beams detected by said photodetector when information in the optical disk of the second recording density is reproduced.

* * * * *